United States Patent [19]

Batey et al.

[11] Patent Number: 5,127,602
[45] Date of Patent: Jul. 7, 1992

[54] NOISE REDUCTION KIT FOR JET TURBINE ENGINES

[75] Inventors: John G. Batey, Cordova; Park W. Burrets; William F. Grewe, both of Memphis; Bruce G. Whitestone, Germantown; Mark D. Yerger, Collierville, all of Tenn.

[73] Assignee: Federal Express Corporation, Memphis, Tenn.

[21] Appl. No.: 439,538

[22] Filed: Nov. 21, 1989

[51] Int. Cl.[5] .................................. B64C 37/02
[52] U.S. Cl. ............................ 244/1 N; 181/213; 181/214
[58] Field of Search ............... 244/1 N; 181/213, 214; 60/262, 264; 239/265.12, 265.17, 265.11

[56] References Cited

U.S. PATENT DOCUMENTS

| | | | |
|---|---|---|---|
| 2,988,302 | 6/1961 | Smith | 244/1 N |
| 3,065,818 | 11/1962 | Lombard et al. | 181/33 |
| 3,455,413 | 7/1969 | Henley | 181/51 |
| 3,542,152 | 11/1974 | Anderson et al. | 181/50 |
| 3,819,009 | 6/1974 | Motsinger | 181/33 G |
| 3,893,640 | 7/1975 | Hull, Jr. et al. | 244/54 |
| 4,137,992 | 2/1979 | Herman | 181/213 |
| 4,235,303 | 11/1980 | Dhoore et al. | 181/214 |
| 4,244,441 | 1/1981 | Tolman | 181/213 |
| 4,384,634 | 5/1983 | Shuttleworth et al. | 181/213 |
| 4,433,751 | 2/1984 | Borneau | 181/213 |
| 4,449,607 | 5/1984 | Forestier et al. | 181/213 |
| 4,452,335 | 6/1984 | Matthews et al. | 181/214 |
| 4,543,784 | 10/1985 | Kirker | 181/213 |
| 4,723,626 | 2/1988 | Carr et al. | 181/213 |
| 4,751,979 | 7/1988 | Wiseman | 181/213 |
| 4,759,513 | 7/1988 | Birbragher | 244/1 N |
| 4,817,756 | 4/1989 | Carr et al. | 181/213 |
| 4,836,469 | 6/1989 | Wagenfeld | 244/1 N |

OTHER PUBLICATIONS

"Flight" magazine Oct. 17, 1958 p. 640.

Primary Examiner—Joseph F. Peters, Jr.
Assistant Examiner—Christopher P. Ellis
Attorney, Agent, or Firm—Finnegan, Henderson, Farabow, Garrett & Dunner

[57] ABSTRACT

A noise reduction kit is provided for installation on a bypass turbine engine having a core engine, an outer casing and a thrust reverser. The kit comprises a mixer downstream of the core engine for mixing fan air of the engine with the exhaust gas from the core engine to reduce the peak velocity of the exhaust gas; a structure for supporting and positioning said mixer relative to the engine; a spacer for extending the length of the exhaust gas flow path between said mixer and the thrust reverser to permit sufficient mixing of the fan air with the exhaust gas prior to reaching the thrust reverser; and an acoustic tail pipe assembly configured to define an outlet area for the engine exhaust gas flow path. The outlet area is sized and shaped to reduce pressure loss in the exhaust gas stream in an amount necessary to compensate for the pressure increase in the exhaust gas stream created by the mixer.

6 Claims, 9 Drawing Sheets

NOISE REDUCTION KIT FOR JET TURBINE ENGINES

BACKGROUND OF THE INVENTION

1. Field of the Invention

The present invention relates generally to jet aircraft turbine engines and, more specifically, to a noise reduction kit for retrofit on an existing engine and airframe.

2. Description of the Related Art

In view of noise restrictions placed upon the use of aircraft in certain areas and at certain times, a need has existed and continues to exist for quiet aircraft engines. There is a significant need for a method to modify conventional engines on aircraft that presently are in service, since aircraft with such engines often cannot be used economically, because of noise restrictions.

The prior art contains many instances of structure adapted specifically for retrofit or original fit on a jet turbine engine to suppress engine noise. Typically, the noise suppression structure consists of sound-attenuating liners applied to the nose cowl, the nose dome, and the fan duct components of the engine. Examples of such installations are shown in U.S. Pat. Nos. 4,751,979; 4,723,626 and 4,443,751. The installation of past prior noise suppression structures and devices in a retrofit application is extremely time consuming and detailed. The past systems also often require significant preventive maintenance to maintain the beneficial effects of noise suppression.

In applicants' view, the past efforts to design or retrofit aircraft engines to suppress noise levels have not been fully acceptable or successful. Many of the past designs and retrofits simply have not provided a meaningful noise reduction. Moreover, these past designs and retrofits have often been prohibitively expensive.

SUMMARY OF THE INVENTION

Accordingly, it is an object of the present invention to provide a noise suppression kit for retrofit installation on bypass type turbine engines which significantly reduces the noise emanating from the engine, particularly during takeoff and approach operations. It is a further object of the present invention to provide a retrofit noise suppression kit for a bypass turbine engine which can be installed with a minimum duration of down time and which can be easily maintained for future flight operations.

It is a still further object of the invention to provide a noise suppression kit for retrofit installation on a bypass type turbine engine which is specifically adapted to minimize back pressure in the exhaust gas stream to thereby significantly reduce any chance of fan stall.

A still further object of the present invention is to provide a noise suppression kit for retrofit installation on a bypass type gas turbine engine wherein the kit is specifically adapted for use with a thrust reverser cascade.

Yet another object is to provide a retrofit kit which provides an improved thrust reverser cascade which cooperates with the other elements of the kit to provide a quieter and improved engine.

Additional objects and advantages of the invention will be set forth in the description which follows, and in part will be obvious from the description, or may be learned by practice of the invention. The objects and advantages of the invention may be realized and attained by means of the elements and combinations particularly pointed out in the appended claims.

To achieve the foregoing objects, and in accordance with the purpose of the invention as embodied and broadly described herein, a noise suppression kit for retrofit installation on a bypass type jet turbine engine having a core engine, an outer casing, and a thrust reverser is provided. The noise reduction kit comprises mixer means, located downstream of the core engine, for mixing fan air with the exhaust gas from the core engine to reduce the velocity of the exhaust gas, means for supporting and positioning the mixer means relative to the engine outer casing, a spacer means for extending the length of the exhaust gas flow path between the mixer means and the thrust reverser to permit sufficient mixing of the fan air with the exhaust gas prior to reaching the thrust reverser, and an acoustic tail pipe assembly configured to define an outlet area for the engine exhaust gas flow path, the outlet area being sized and shaped to reduce pressure levels in the exhaust gas stream in an amount necessary to compensate for the pressure increase in the exhaust gas created by the mixer means.

In a preferred embodiment, the mixer means includes a mixer having an array of axially and radially elongated hot and cold chutes and fairing means for initially directing fan air into the cold chutes and exhaust gas into the hot chutes. Hot exhaust gases from the core engine pass through the hot chutes of the mixer and mix with the cold fan air passing through the cold chutes. The majority of this mixing takes place downstream of the mixer means. The spacer means preferably is a cylindrically shaped spacer having a predetermined length and defining the exhaust gas flow path between the mixer and the thrust reverser.

Preferably, a modified thrust reverser cascade assembly is provided with the kit to replace the conventional thrust reverser. The modified thrust reverser cascade is adapted such that the reduced velocity mixture of fan air and core exhaust gases flow smoothly through the thrust reverser cascade assembly without creating a stagnation point in the flow path defined by the cascade of the thrust reverser assembly. This result, in part, is achieved by the use of a modified tail pipe assembly to replace the tail pipe assembly of the original engine.

It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate a presently preferred embodiment of the invention and, together with the general description given above and the detailed description of the preferred embodiment given below, serve to explain the principles of the invention.

In the drawings.

DESCRIPTION OF THE PREFERRED EMBODIMENT

Reference will now be made in detail to the presently preferred embodiment of the invention as illustrated in the accompanying drawings, wherein like reference numbers designate like or corresponding parts throughout the several drawings.

The preferred embodiment of the elements of the noise suppression kit of the present invention have been sized for fit up in a Pratt & Whitney JT8D engine which is used, for example, on Boeing 727 aircraft 1. A description of the retrofit kit and installation of the preferred embodiment of the present invention will therefore be described with specific reference to that engine. However, it will be recognized by persons skilled in the art that the present invention can be applied to other gas turbine bypass engines.

Figures 1, 1A:
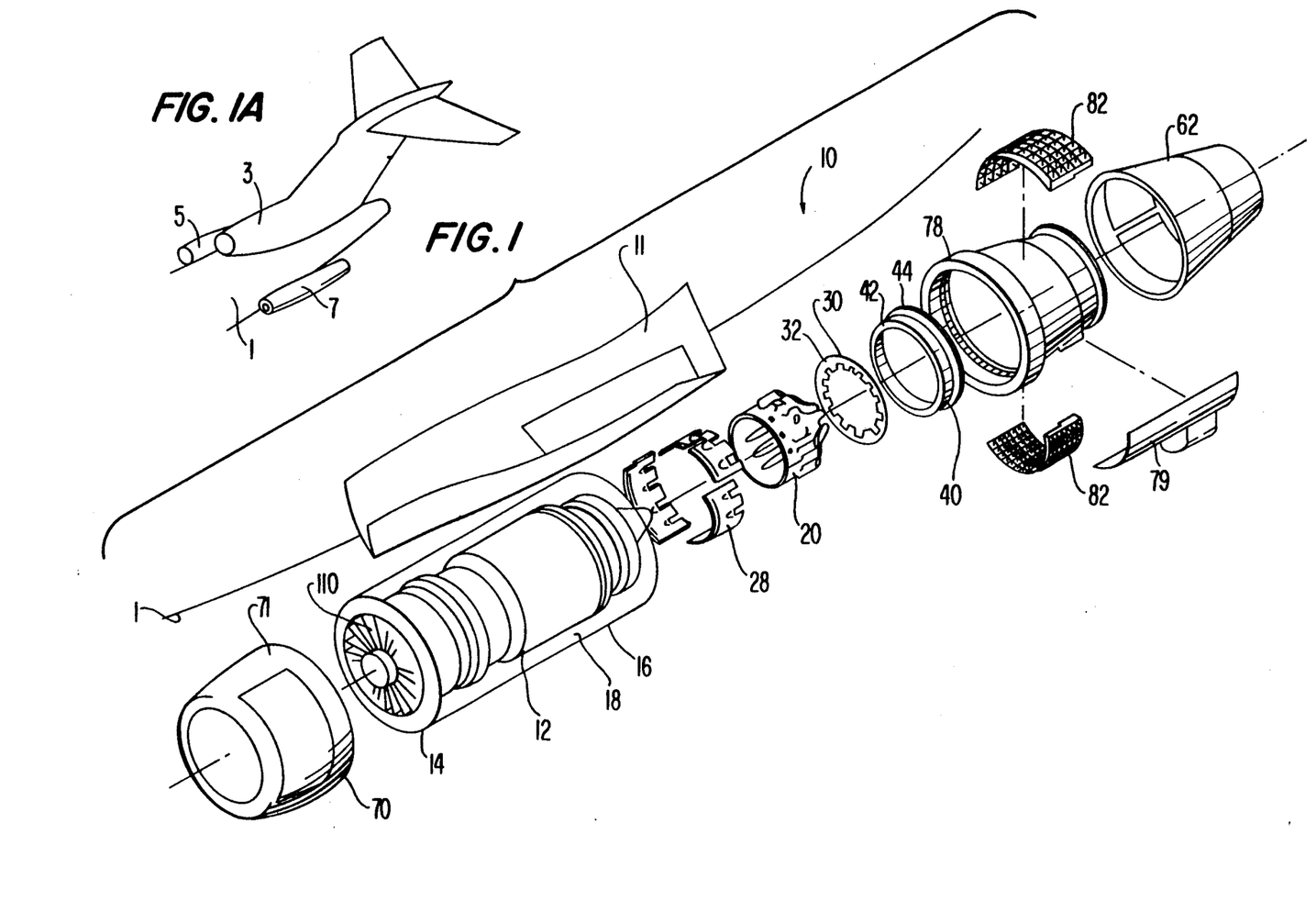
FIG. 1 is an exploded perspective view of the elements of the noise suppression kit in relation to the engine and the air frame.
FIG. 1A is a perspective view of the engine location on an aircraft.

FIG. 1 illustrates an exploded view of the noise reduction kit of the present invention as it fits on the JT8D engine. The kit is generally referenced as 10. Core engine 12 includes high and low pressure compressors, a combustor, a high pressure turbine, and a low pressure turbine aligned in series flow relationship. An upstream fan 14, known in the art as a C-1 fan, precedes core engine 12 in the engine configuration. Core engine 12 includes an outer casing 16 which defines an annular bypass duct 18 between casing 16 and the components of core engine 12. Fan 14 is utilized to pressurized the stream of fan air flowing through the bypass duct 18 and about the components of core engine 12.

Noise suppression kit 10 includes an acoustically treated nose cowl 70, a modified C-1 fan 14, a mixer fairing 28, a mixer 20, a mixer support ring 30, a spacer 40, a thrust reverser shroud 78, a pair of cascade vane fairing assemblies 80, a pair of cascade vane assemblies 82, a pair of modified clam shell doors 90, a clam shell door seal assembly 94, a clam shell door stop assembly 120, a thrust reverser track cover 60, an acoustically treated and modified tail pipe 62, and, in certain embodiments, a modified pylon fairing assembly 11.

As shown generally in FIG. 1, the acoustically treated nose cowl 70 has the same size and shape as a conventional nose cowl for the engine. The inlets are acoustically treated by addition of sound deadening material 71 to the interior surface of the nose cowl. This material is added to attenuate turbo-machinery noise and serves to reduce noise during the operation of the engine. For a conventional 727 aircraft with three engines, the acoustically treated nose cowl is added to each of the nacelle engines on the outboard sides of the tail, but not to the center engine.

Figure 8:
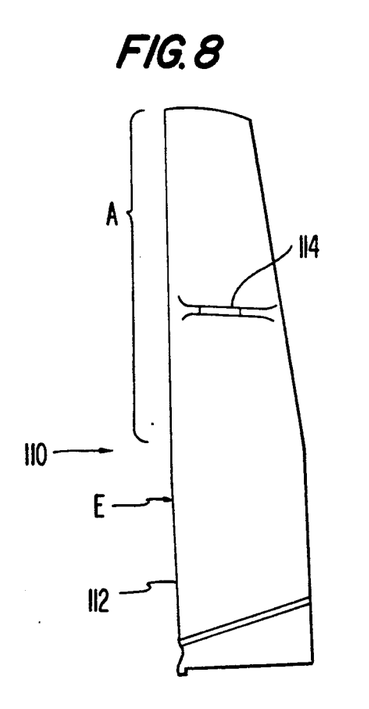
FIG. 8 illustrates a fan blade of an engine.
Figure 9:
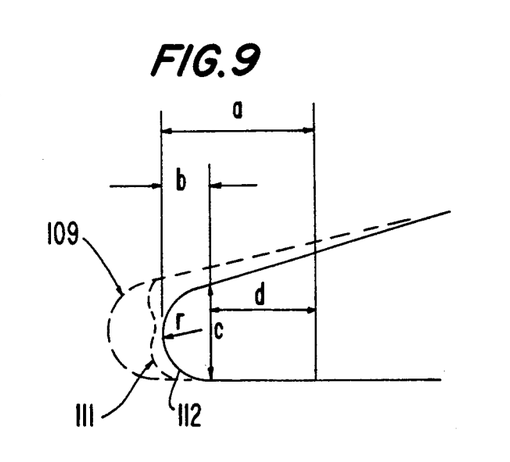
FIG. 9 illustrates the manner in which conventional engine fan blades are refurbished according to the present invention.

As will be described below, the addition of the elements of the present invention modifies the inherent gas flow pattern and the dynamics of the engine. To compensate for this modification in gas flow and engine dynamics, the C-1 fan of the engine is modified to recontour the leading edge of the fan blade and, if necessary, to decrease clearances at the mid-span shroud. As shown generally in FIG. 1, the C-1 fan 14 includes a plurality of fan blades 10 which are fixed to the fan hub in a conventional manner. An example of one of these fan blades is shown in FIG. 8. As shown, the fan blade 110 includes a leading edge 112 and two mid-span shrouds 114, one on each side of each blade (one shown). When modifying a conventional engine, the leading edge of each fan blade is modified with a special tool to create, by rechamfering, a new leading edge profile or contour. The tool used to reshape the blade is similar to conventional tools used to create the original contour. As shown in FIG. 9, the leading edge 112 of the fan blades is modified to take the shape shown in the solid lines. The outside dotted line (109) is the original contour and the inside dotted line (111) represents an eroded contour, after substantial use. The gage thickness at c is 0.018 inches, and the gage thickness at d is 0.024 inches in area A of FIG. 8 and is 0.027 inches in area B of FIG. 8. The distance a in FIG. 9 is typically 0.030 inches, and the distance b in FIG. 9 is typically 0.009 inches. The radius r is typically 0.018 inches. The recontouring of the fan blades reduces fan blade stress.

In addition to the modification of the blade shape, the length of the shrouds 114 of each blade must be checked and, if necessary, brought up to blueprint specifications: approximately 2.970 inches between the outer ends of the shrouds on a blade. If the shrouds through wear do not meet this standard, the ends are slightly built up by applying a layer of metal preferably through a plasma process or a similar process which is well known in the art. As a result, the distance between shrouds of the respective fan blades (when the blades are attached to the fan hub) is brought back to blueprint specification, thereby increasing the stability of the blades and reducing fan blade stress.

Noise suppression kit 10 includes mixer means for directing fan air into the exhaust gas flow path downstream of the core engine. As embodied herein and in accordance with the invention, the mixer means comprises a mixer 20 which in the preferred embodiment includes twelve circumferentially spaced axially and radially elongated lobes 22 which define alternating hot and cold chutes 36 and 38. As shown in FIGS. 2-5, the cold chutes 38 are on the outside, where the bypass air is located, and the hot chutes 36 are aligned with the interior core where the hot core air flows. Mixer 20 is designed to blend fan air passing through fan duct 18 with core exhaust gas emerging from the downstream low pressure turbine of core engine 12.

Figure 12:
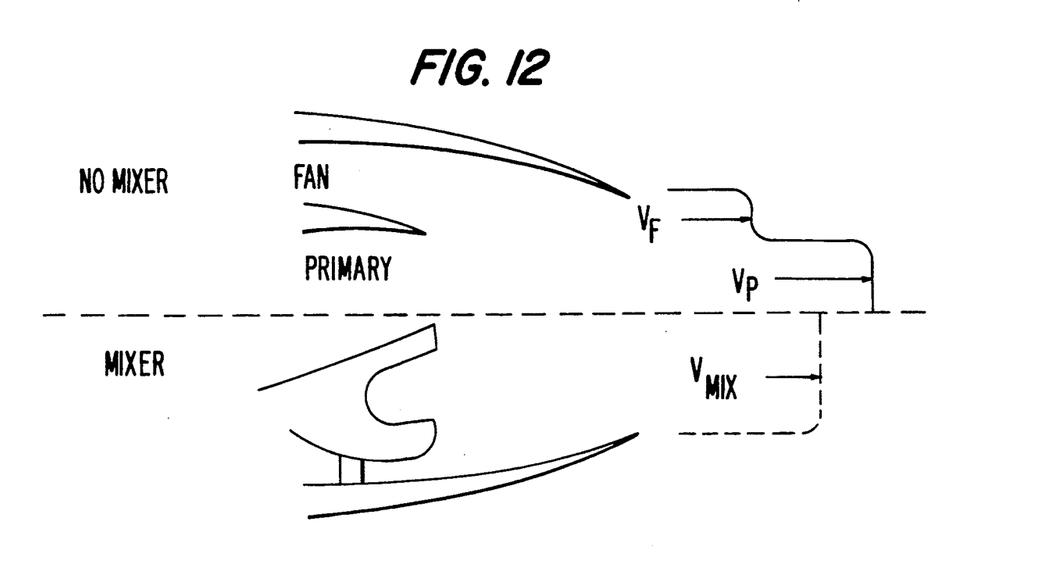
FIG. 12 is a diagram illustrating the gas velocity downstream of the mixer according to the present invention.

As described more fully below, the mixing reduces peak velocity of the exhaust stream and therefore reduces jet noise. FIG. 12 illustrates by a comparative diagram the velocity reduction achieved by the mixer. Since thrust noise is a function of the peak velocity of the exhaust gas stream raised to the eighth power, even slight reductions in the peak overall jet velocity result in significant lowering of the engine thrust noise.

The mixer of the present invention is designed to provide the optimum mixing, without adversely affecting the engine efficiency. The mixer, as shown in FIGS. 2-5, has a plurality of alternating hot gas ducts 36 and cold gas ducts 38. Gas from the bypass duct 18 enters into the cold gas ducts which incline radially inward. The colder bypass gas therefore is directed toward the axis of the engine. Exhaust gas from the core of the engine flows through the hot gas ducts which have a greater cross section and which incline slightly outward in a radial direction. As illustrated in FIG. 12, the hot and cold (primary and fan) gas mix downstream of the mixer 20 with the result that the velocity of the mixed gas is less than that of the core gas. This decrease in velocity results in a decrease in noise, since the noise is a function of the maximum gas velocity exiting the engine tail pipe.

A fairing means for initially directing the fan air into cold chutes 38 of mixer 20 and the hot exhaust gas into the hot chutes 36 of the mixer is provided immediately upstream of the mixer 20. As embodied herein and in accordance with the present invention, the aerodynamic streamlining of the fan stream is achieved with aluminum fairing 28 that engages a hard faced rear lip of the exhaust case fairings of core engine 12. Preferably, the fairing 28 is supplied in three separate 120° arc segments for fit up with the hard faced rear lip of the exhaust case. Fairing 38 initially changes the direction of the fan air stream through fan duct 18 to direct the flow to the inlet of engine cold chutes 26 of the mixer and thereby assist in achieving laminar flow through the downstream portion of the engine. Fairing 28 is sized and shaped at its inlet portion to match the engine casing 16 and is sized and shaped at its outlet end to match the inlet of the mixer 20. As a result, the fairing prevents the mixing of hot and cold gases until the gases flow into the mixer.

The mixer fairing 28 is fixed to the mixer 20 by mechanical means, such as screws. In the preferred embodiment, a plurality of first bosses 27 are formed about the circumference of the inlet of the mixer in general alignment with cold chutes 38. Similarly, a plurality of second bosses 29, spaced downstream from the first bosses, are formed about the circumference of the mixer in general alignment with hot chutes 36. These first and second bosses have threaded openings, and the mixer fairing, when placed on the mixer, have openings aligned with the threaded openings in the bosses. The fairing and mixer are then united through the use of screws or bolts which thread into the first and second bosses on the mixer.

The present invention further includes means for supporting and positioning the mixer 20 relative to the engine outer casing. As embodied herein, the supporting means includes a mixer mount ring 30 which includes a plurality of ring flanges 32. The mixer mount ring 30 is adapted to extend around mixer 20. A plurality of hard faced bosses 33 are provided on each outer lobe 22 of mixer 20 and are used to attach the mixer to mixer mount ring 30 through ring flanges 32. By way of example, and not limitation, bolts may be used to secure the mixer to the mount ring both axially and circumferentially, thereby fixing mixer 20 relative to the remaining components of the engine.

Figure 2:
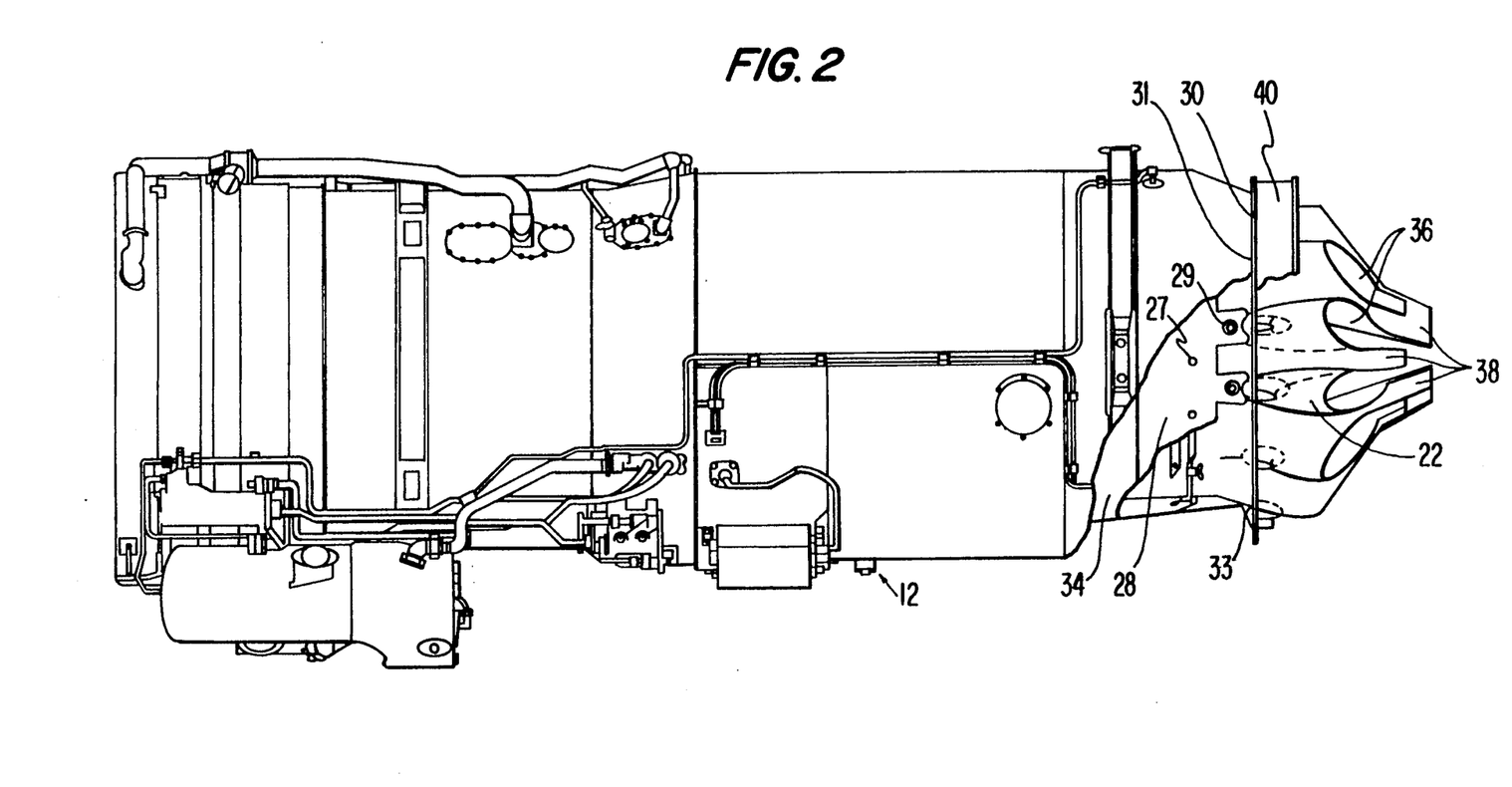
FIG. 2 is side view of a portion of a modified jet turbine engine and illustrates the mixer fairing, the mixer, and the spacer of the present invention.
Figure 3:
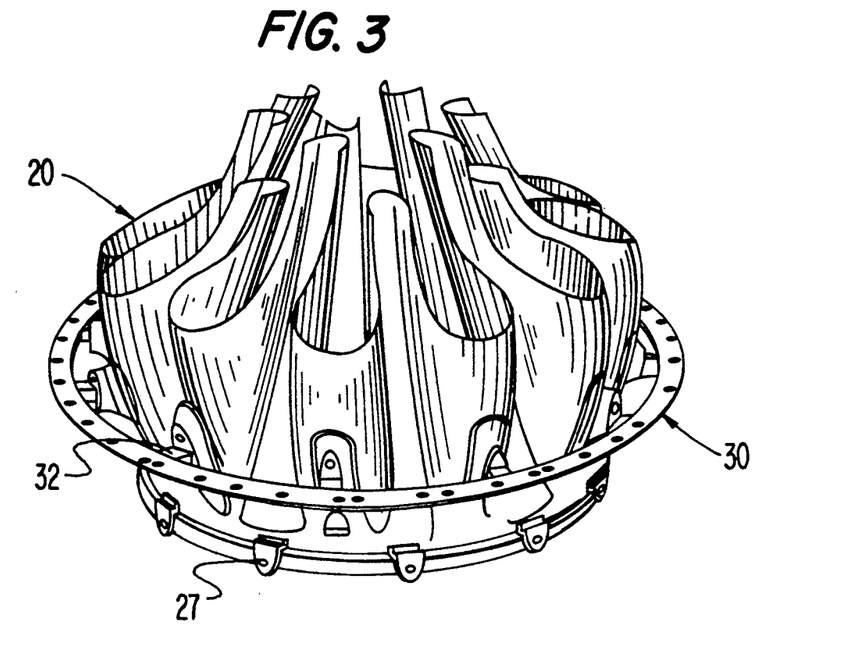
FIG. 3 is a perspective view illustrating a mixer and a mixer support ring of the present invention.
Figure 4:
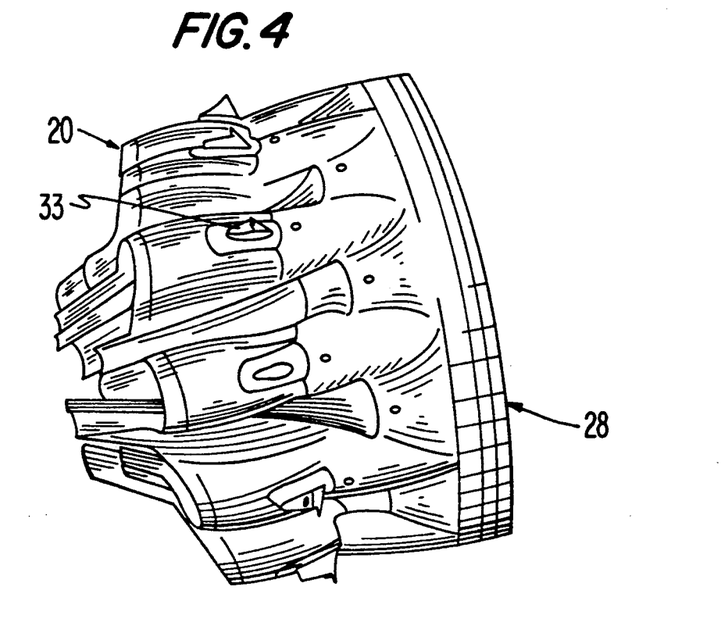
FIG. 4 is a perspective view illustrating the mixer and mixer fairing of the present invention.
Figure 5:
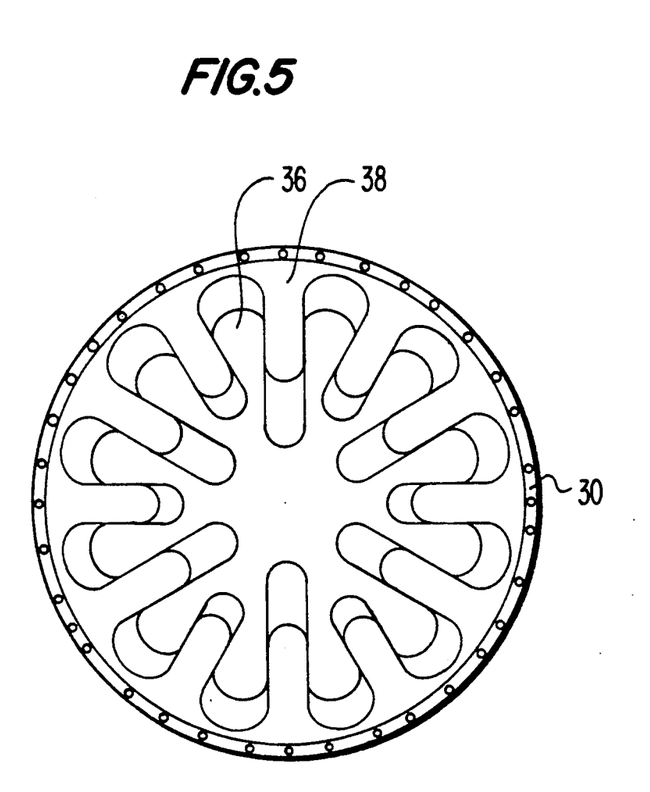
FIG. 5 is a rear axial view of the mixer and mixer support ring of the present invention.

Mixer mount ring 30 is fixed relative to engine casing 16 by counter-sunk screws threaded into holes tapped into a downstream flange of core engine 12. The mixer mount ring 30 is also held in place by the downstream exhaust hardware. This fitted up configuration of the mixer faring 28 and mixer 20 on the downstream end of core engine 12 is best illustrated in FIG. 2. Mixer faring 28 is bolted up to turbine exhaust case faring 34. When the mixer is mounted onto the engine, the mixer mount ring 30 is sandwiched between the engine M flange 31 (shown in FIG. 2) and the spacer case 40. The mixer ring thus is fixed to the engine and spacer by bolts in a conventional manner.

The exhaust hardware which will be fitted downstream of core engine 12 is displaced rearwardly by the width of mixer mount ring flange 32. In the preferred embodiment of the present invention designed for fit up with a JT8D engine, the mixer mount ring flange width is specified at 0.160 inches, thereby displacing the downstream exhaust hardware rearwardly by that amount.

To ensure that smooth laminar flow is attained in the mixed fan air and core gas stream prior to arriving at the thrust reverser outlets which will be described in more detail below, spacer means are provided for extending the length of the exhaust gas flow path between the mixer 20 and the thrust reverser. As embodied herein, the spacer means includes a cylindrically shaped spacer 40 having annular flanges 42 and 44 at the upstream and downstream ends, respectively, of spacer 40. In the preferred embodiment of the present invention wherein the noise suppression kit is adapted for installation on the JT8D engines, the spacer 40 has a length of approximately 4 inches thereby moving the aircraft exhaust hardware rearwardly by a corresponding distance. This additional distance which is realized between the exhaust hardware and mixer 20 permits sufficient mixing of the low velocity fan air with the high velocity core gases to achieve substantially laminar flow prior to reaching the thrust reverser outlets. The inner diameter of spacer 40 is equal to the inner diameter of the engine at the mating point.

The kit of the present invention is preferably designed for application to a Boeing 727 aircraft 1 which has a center engine 3 and two outboard engines 57. In the center engine, flange 42 of spacer 40 mates up directly with the mixer support ring 30. In the outer engines, flange 42 of spacer 40 mates up with mixer support ring 30 via a wedge adapter which is generally annular in shape. Such a wedge adapter is used in conventional engines at the outboard engines, as is known in the art. The flange 42 has a number of apertures for receiving a corresponding number of bolts to firmly fix spacer 40 to the wedge adapter and support ring 30.

Figure 6:
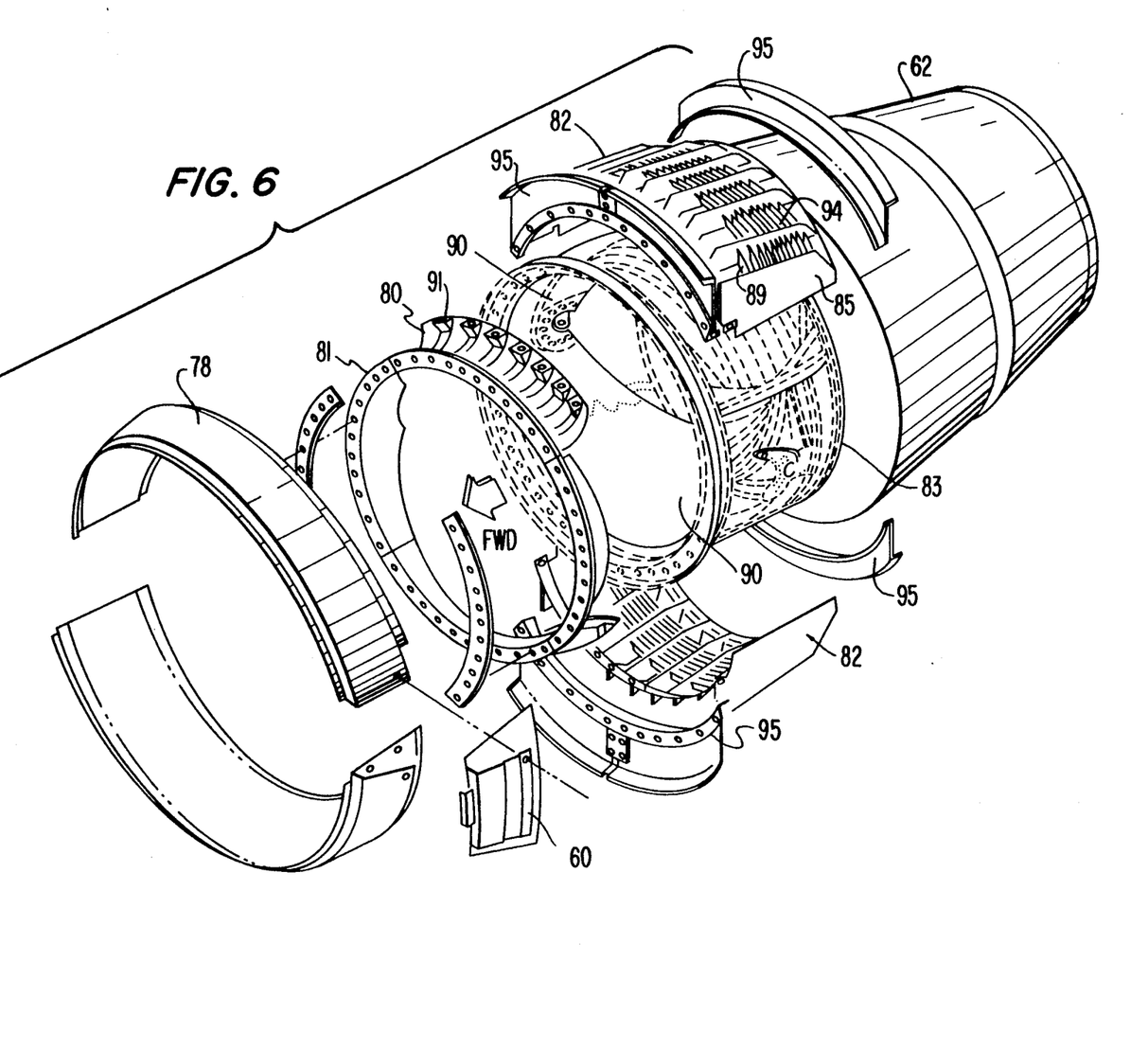
FIG. 6 is an exploded perspective view of a rear portion of an engine modified by the noise suppression kit of the present invention.

In the preferred embodiment, the noise suppression kit 10 of the present invention includes with a modified thrust reverser cascade assembly as illustrated generally in FIG. 6. The modified thrust reverser cascade assembly 82 includes an array of vanes 84 which are spaced apart from one another to increase the exit area through the thrust reversing outlet. A forward fairing assembly 80 is disposed immediately upstream of modified cascade vane assembly 82 and is configured to direct the exhaust gases through the vanes of the cascade vane assembly in a smooth manner. The larger exit area of the modified cascade assembly 82 in combination with the cascade vane fairing assembly 80 eliminates flow stagnation of the air flow, thereby increasing the overall efficiency of the thrust reverser.

As shown in FIG. 6, a fairing assembly 80 of the present invention is attached to the forward seal assembly 81 and curves upwardly and outwardly so as to direct the flow of mixed exhaust gases to the cascade vane assembly 82 of the thrust reverser. In actual application, two separate fairing assemblies 80 (one shown) are added to the engine, and these fairing assemblies are aligned respectively with two cascade vane assemblies 82 which are added to the engine.

Figure 7:
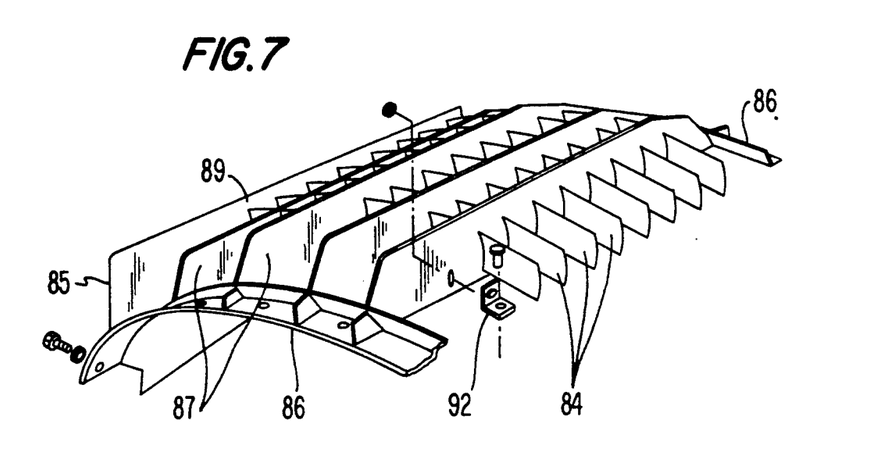
FIG. 7 is a perspective view of a portion of a cascade vane assembly made according to the present invention.

The kit of the present invention includes modified and improved cascade vanes to provide maximum reverse thrust without creating flow stagnation. Each engine includes two separate but identical cascade vane assemblies 82 which are fixed to the thrust reverser frame and are 180° circumferentially displaced. As shown in FIG. 7, the cascade vane assembly includes an arcuate frame 83 having two opposing side members 85 (only one shown) and two opposing front and rear members 86. Front and rear support assemblies 95 are secured to respective members 85 providing means to secure the cascade assemblies 82 to frame 83. A plurality of longitudinal support beams 87 (in the preferred embodiment 9) extend between and are fixed to the front and rear members 86. The cascade includes 8 continuous primary vanes 84 and two secondary vanes 89 which are located only in the circumferentially outer areas. Vanes 84 are curved and fit through the support beams 87. In the preferred embodiment, the beams 87 are equally spaced from each other by 4.1 inches, and the 8 primary vanes are spaced from each other by approximately 1.5 inches. The vanes 84, 89 are arcuate in shape and are angled to reverse the flow of air, thereby providing reverse thrust.

Attachment brackets 92 are fixed to the longitudinal beams 87 for fixing the trailing edge 91 of the fairing 80 to the cascade vane assembly 82. As shown, each fairling 80 extends over the majority, but not all, of the circumferential width of its respective vane cascade assembly 82. The secondary vanes 89 are located at the ends of Cascade assembly 82 where the fairings 80 terminate and are substantially in line with the trailing edge 91 of the fairing.

Although the modified cascade assembly 82 and cascade vane fairing 80 are not required items of the noise suppression kit of the present invention, their use is preferred. The use of the modified cascade vane assembly 82 substantially eliminates any chance of stagnation of flow through the cascade vane assembly.

In a conventional JT8D engine, gas from the engine flows directly into a conventional cascade thrust reverser assembly that includes two clam shell doors 90. Such a conventional engine includes a forward clam shell door seal assembly. That conventional seal assembly includes finger seals, supported on forward seal assembly 81, that interface with the clam shell doors, when in the stowed position. In a conventional engine, when the clam shell doors are pneumatically pivoted to the closed (as opposed to the stowed) position, the gas flow is then redirected to the cascade vanes to provide reverse thrust.

Figure 10:
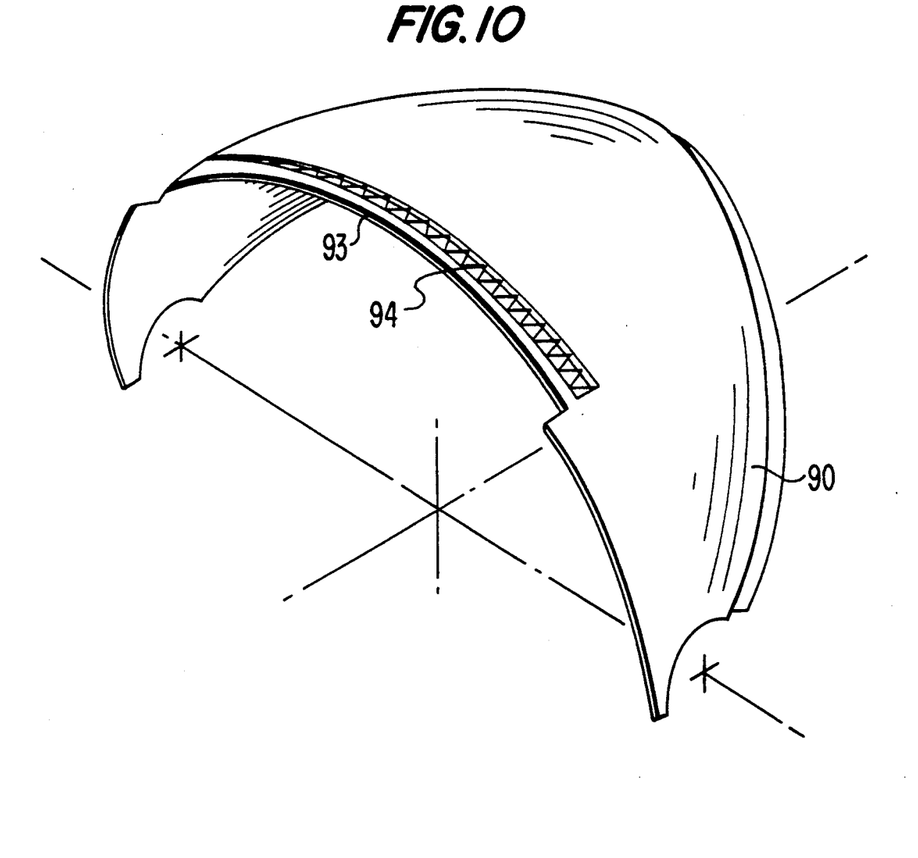
FIG. 10 is a view illustrating the modified leading edge of one of the clam shell doors, modified according to the present invention.

In the preferred embodiment of the present invention, the forward seal assembly 81 is modified by including cascade fairing 80 and deleting the finger seals. Because the fairing assembly extends rearwardly beyond the conventional forward seal assembly 81, the clam shell doors must be modified to fit within the space provided. Moreover, the assembly must be modified to provide a seal to replace the seal provided between the finger seals and the clam shell doors of a conventional engine. In the preferred embodiment, this is achieved by removing a portion of the leading edge of the clam shell doors and then adding a seal assembly to the modified leading edge. As shown in FIG. 10, approximately 1.5 inches of metal are cut from the leading edge 93 of the clam shell doors 90. A seal assembly 94 is then added to the clam shell door at a position immediately rearward of this cut-out portion. In the preferred embodiment, seal material is placed on the clam shell door, a metal retainer is placed over the seal material, and the seal material and metal retainer are held in place by rivets.

Preferably, the seal assembly material added to the clam shell doors is a metallic braided rope which is fixed to the modified leading edge of each of the clam shell doors. When the clam shell doors are in the stowed position, the braided rope interfaces with the cascade vane fairing 80, thereby preventing the flow of gas to the cascade vanes.

Figure 11:
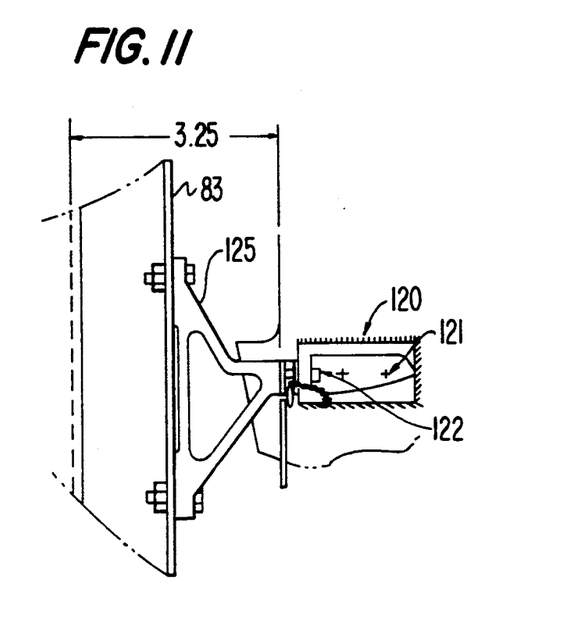
FIG. 11 is a view illustrating an adjustable door stop made according to the present invention.

The kit of the present invention includes clam shell door stops to position the doors in the maximum allowable stowed position and prevent overtravel which would result in seal damage. As shown in FIG. 11, the stop assembly includes adjustable stops 120 fixed to each of the clam shell doors and complementary stop members 125 formed on the thrust reverser frame 83. Preferably a pair of adjustable stops and stop members are used for each clam shell door. The adjustable stops include a bracket 121 which is welded to the clam shell door and a bolt 122 which is threaded into the bracket 121. The bolt can be adjusted and then locked in place with a nut or similar structure. The complementary stop member 125 provides a surface against which the bolt interfaces and is preferably bolted to the thrust reverser frame 83. The stop members are adjusted so that when the clam shell doors are pneumatically placed in the stowed position, the cascade doors are aligned with the flow channel to provide optimum flow, and the braided seal is optimally compressed.

As shown in FIG. 6, the kit of the present invention includes a thrust reverser shroud assembly 78 including a cover 60. The thrust reverser shroud assembly is a cylindrical aerodynamic fairing having an increased length of approximately 4.25 inches. This shroud is attached to the thrust reverser frame 83 and covers the fairlings, the seal assembly 81 and a portion of the cascade vane assemblies. The shroud provides an aerodynamic transition from the engine casing 16 to the thrust reverser. The kit also includes a thrust reverser track cover assembly 70 providing an aerodynamic fairing for the clam shell door actuation mechanism.

Figure 13:
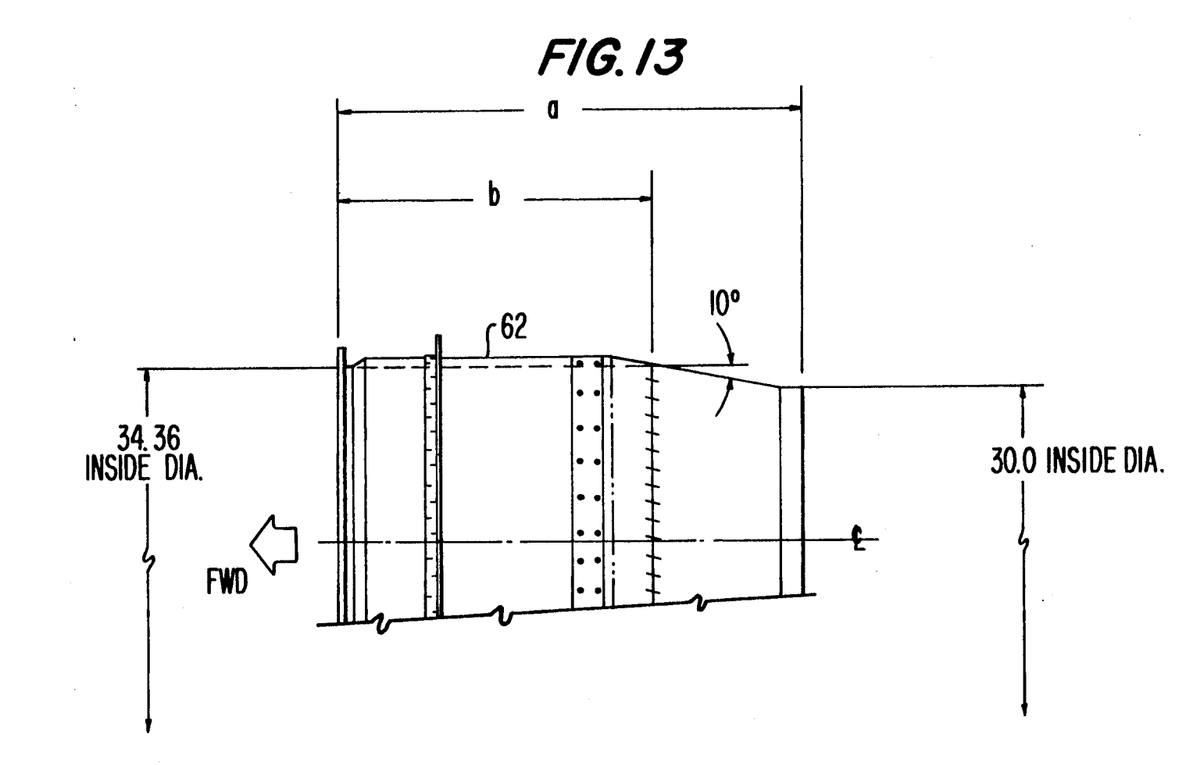
FIG. 13 is a partial view illustrating the tail pipe of the present invention.

Noise suppression kit 10 further includes a modified tail pipe assembly 62 which is configured to have a greater cross sectional area in the exit plane so as to accommodate increased pressure in the flow stream caused by introduction of the various components, primarily the mixer 20, within the exhaust gas flow path. With reference to FIG. 13, the modified tail 62 pipe for a JT80 engine has a total length of 32.79 inches (a), an inside inlet diameter of 34.36 inches, and an inside exhaust diameter of 30.0 inches. As shown in FIG. 13, the tail pipe is cylindrical in shape for approximately 19.72 inches (b) and then angles inwardly at an angle of approximately 10% to form a cone. Tail pipe assembly 62 preferably is also outfitted with acoustic inner walls so as to further suppress noise.

When conventional engines are modified to include the noise suppression kit of the present invention, the engine will have an extended length. As a result of this extended length, it is preferable to modify the rear portion of the aircraft pylon 11 for the outer engines. In practice, the aft portion of the pylon fairing assembly is removed and replaced with a modified fairing assembly 10 which has a lesser width and thereby maintains the desired engine thrust reverser assembly to pylon fairing clearance. The design of the modified pylon is largely dictated by the geometry presented by the existing aircraft, the modified engine, and the required clearance.

The elements of the retrofit kit having been described, the method of retrofitting an engine and aircraft according to the present invention will now be briefly summarized. First, the aircraft engines to be modified are removed from the aircraft. Portions of the engine other than the core engine are then disassembled in a conventional manner.

Fan blades 110 of the C-1 fan are removed and modified to have the improved contour and lengthened shrouds, as previously described. The modified fan blades are then reattached to the C-1 fan. The fairing assembly 28, the mixer 20, and spacer 40 are then fitted onto the core engine during the process. Similarly, the original nose cowl is replaced with the acoustically treated nose cowl 70 of the present invention.

At the rear portion of the engine, the conventional thrust reverser cascades are removed, as are the finger seals for the original clam shell doors 90. The clam shell doors are modified by cutting out the areas previously described and adding the braided rope seal to the clam shell doors. Once these clam shell doors are modified, the thrust reverser fairing 80 of the present invention and the modified cascade vane assemblies 82 are added to the engine in the manner previously described. The original cascade vane assemblies are discarded.

The exhaust tail pipe of the conventional engine is replaced by the modified tail pipe 62, having both the modified design disclosed in this invention, along with acoustic treatment. The thrust reverser shroud 78 and the thrust reverser track cover 79 similarly are added in place of the original equipment.

Before a modified engine is added to an aircraft, the pylon assembly of the aircraft is also modified, as previously described, to provide the appropriate clearances between the pylon and the modified engine. The engine, with the complete retrofitted kit, is then reattached to the aircraft and is ready for operation.

It has been found that the engines can be modified according to the present invention in approximately one week. Typically, the modified engines can be added to an aircraft in a weekend.

Additional advantages and modifications will readily occur to those skilled in the art. Thus, the invention in its broader aspects is not limited to the specific details, representative devices and illustrative examples shown and described. Accordingly, departures may be made from such detail without departing from the spirit or scope of the genera inventive concept as defined by the appended claims and their equivalents.

What is claimed is:

1. A noise reduction kit for modifying a fan jet engine having a core engine generating axial exhaust gas flow through a downstream end thereof, an outer casing defining an annular bypass duct surrounding the core engine, a fan at the upstream end of the core engine for generating axial fan air flow through the bypass duct, a thrust reverser for selectively converting axial flow of exhaust gas and fan air into reverse thrust, and a tail pipe assembly disposed to axially receive and exhaust the exhaust gas and fan air, the kit comprising:

a mixer having an upstream end and an annular mixer wall axially extending downstream therefrom, the wall being formed into a plurality of circumferentially alternating radially inward and radially outward lobes, the radially inward lobes defining cold chutes for radially inwardly diverting fan air and the radially outward lobes defining hot chutes for permitting radially outward expansion of exhaust gas;

an annular mounting bracket for fixing the mixer to the casing in position downstream of and coaxial with the core engine;

a fairing having an upstream end for coaxial attachment to the downstream end of the core engine and an annular, axially-extending fairing wall for attachment to the upstream end of the mixer, the fairing wall being shaped to aerodynamically conform to the lobes of the mixer to direct fan air to the cold chutes and exhaust gas to the hot chutes; and an annular spacer for axial disposition between the downstream end of the core engine and the thrust reverser, the spacer extending the axial flow path sufficiently to permit achieving generally smooth laminar flow of mixed exhaust gas and fan air downstream of the mixer.

2. The kit of claim 1 wherein the thrust reverser of the fan jet engine includes an annular frame defining an axial passage between an upstream end and the tail pipe assembly, a seal assembly fixed to the upstream end of the frame, and a pair of clam shell doors pivotally mounted to the frame for selective movement between a stowed position permitting axial gas flow through the frame and a closed position obstructing the axial gas flow through the frame, the kit further comprising:

a pair of cascade assemblies for attachment to the frame in radially opposed relation for receiving gas flow and generating reverse thrust when the doors are in the closed position, each cascade assembly including an array of spaced vanes; and a pair of seal fairings for attachment to the seal assembly in radially opposed relation, each seal fairing extending axially downstream from the seal assembly to engage a respective one of the cascade assemblies to direct gas flow thereto when the doors are in the closed position and to sealingly engage a respective one of the doors when in the stowed position.

3. The kit of claim 2 further comprising an acoustically dampened tail pipe assembly to replace the tail pipe assembly of the engine and an acoustically dampened nose cone for coaxial attachment to the upstream end of the cone engine.

4. The kit of claim 2 further comprising an acoustically dampened tail pipe assembly having a larger exhaust opening at the downstream end than the tail pipe assembly of the engine.

5. The kit of claim 2 further comprising a modified pylon fairing assembly for mounting an engine modified by the kit to an aircraft.

6. A method of modifying a fan jet engine to reduce noise, the engine having a core engine generating axial exhaust gas flow through a downstream end thereof, an outer casing defining an annular bypass duct surrounding the core engine, a fan having blades at the upstream end of the core engine for generating axial fan air flow through the bypass duct, a nose cowl coaxially defining an air intake to the fan, a thrust reverser having clam shell doors moveable between stowed and closed positions for selectively diverting axial flow of exhaust gas and fan air into radially-opposed cascade vane assemblies defining gas exit areas for generating reverse thrust, and a tail pipe assembly disposed to axially receive and exhaust the exhaust gas and fan air, the method comprising the steps of:

removing components of the engine from the upstream and downstream ends of the core engine;

modifying the contour of each blade of the fan;

installing coaxially downstream to the core engine mixing means for radially inwardly diverting fan air and for permitting radially outward expansion of exhaust gas to mix the fan air and exhaust gas;

installing an annular spacer coaxially between the downstream end of the core engine and the thrust reverser, the spacer extending the axial flow path sufficiently to permit achieving generally smooth laminar flow of the mixed exhaust gas and fan air upstream of the thrust reverser;

replacing the cascade assemblies with new cascade assemblies defining increased exit areas;

installing a pair of radially-opposed seal fairings at the upstream end of the thrust reverser, each seal fairing being disposed to engage a respective one of the new cascade assemblies to direct gas flow thereto when the clam shell doors are in the closed position and to sealingly engage a respective one of the doors when in the stowed position; and     modifying the clam shell doors to permit sealing engagement with the seal fairings when in the stowed position.

* * * * *

REEXAMINATION CERTIFICATE (2556th)
United States Patent [19]
Batey et al.

[11] B1 5,127,602
[45] Certificate Issued  May 2, 1995

[54] NOISE REDUCTION KIT FOR JET TURBINE ENGINES

[75] Inventors: John G. Batey, Cordova; Park W. Burrets; William F. Grewe, both of Memphis; Bruce G. Whitestone, Germantown; Mark D. Yerger, Collierville, all of Tenn.

[73] Assignee: Federal Express Corporation, Memphis, Tenn.

Reexamination Request:
No. 90/003,531, Aug. 16, 1994

Reexamination Certificate for:
Patent No.: 5,127,602
Issued: Jul. 7, 1992
Appl. No.: 439,538
Filed: Nov. 21, 1989

[51] Int. Cl.$^6$ .............................................. B64C 37/02
[52] U.S. Cl. .................... 244/1 N; 181/213; 181/214
[58] Field of Search ................. 244/1 N; 181/213, 214

[56] References Cited

U.S. PATENT DOCUMENTS 3,696,617 10/1972 Ellis ........................................ 60/229
4,401,269 8/1983 Eiler .............................. 239/265.17

OTHER PUBLICATIONS

Pratt & Whitney "JT8D-209 Turbofan engine model specification". Jan. 10, 1977.
Pratt & Whitney "JT8D Maintanence Manual". Nov. 1, 1981.
Pratt & Whitney "JT3D illustrated Thrust reverser parts catalog". Oct. 1, 1974.
Boeing Commercial Jet Overhaul Manual for Forward Seal Assembly. Nov. 10, 1974.
Boeing Commercial Jet Overhaul Manual for Cascade type Thrust Reverser May 10, 1982.
Boeing Commercial Jet Overhaul Manual Thrust Reverser installation May 10, 1975.
Boeing Commercial Jet Overhaul Manual Vaporshell for Assembly May 15, 1969.
Blumenthal et al., "Aircraft Community Noise Research and Development", Jul., 1975.
J. F. Brindley, "Pratt & Whitney's JT8D-209 program", Sep. 5, 1979.
Boeing Commercial Jet Overhaul Manual for Thrust Reverser Tailpipe.
C. L. Arctander et al. "Development of Noise Reduction Concepts for 727, 737", Mar. 5, 1975.
(NASA) "Program on Ground Test of Modified, Quiet, Clean, J3D and JT8D Turbofan Engines in their Nacelles".
Pratt & Whitney JT8D-200 Commercial Installation Handbook, Mar. 1, 1978.
Boeing Commercial Jet Overhaul Manual, Thrust Reverser Adapter Assembly, Nov. 10, 1977.
Boeing Commercial Jet Overhaul Manual Aug. 10, 1975.

*Primary Examiner*—Margaret A. Focarino

[57] ABSTRACT

A noise reduction kit is provided for installation on a bypass turbine engine having a core engine, an outer casing and a thrust reverser. The kit comprises a mixer downstream of the core engine for mixing fan air of the engine with the exhaust gas from the core engine to reduce the peak velocity of the exhaust gas; a structure for supporting and positioning said mixer relative to the engine; a spacer for extending the length of the exhaust gas flow path between said mixer and the thrust reverser to permit sufficient mixing of the fan air with the exhaust gas prior to reaching the thrust reverser; and an acoustic tail pipe assembly configured to define an outlet area for the engine exhaust gas flow path. The outlet area is sized and shaped to reduce pressure loss in the exhaust gas stream in an amount necessary to compensate for the pressure increase in the exhaust gas stream created by the mixer.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-6 is confirmed.

* * * * *